Sept. 7, 1965  K. KARNATH ET AL  3,204,985
TRAILER COUPLING
Filed March 7, 1963  4 Sheets-Sheet 1
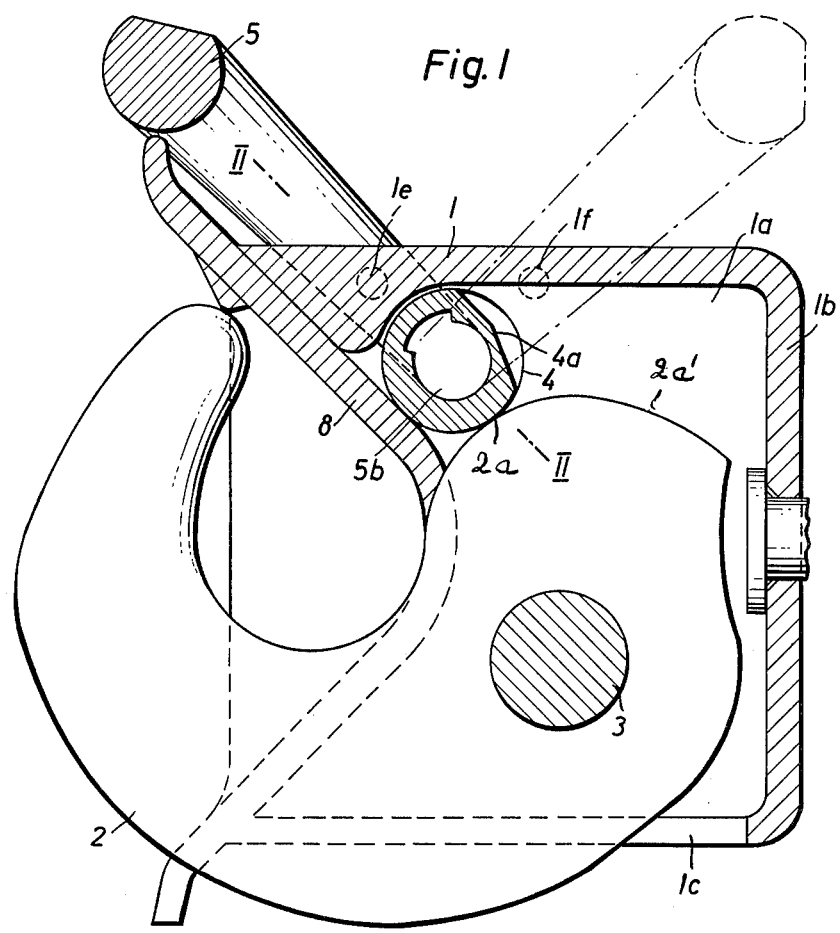
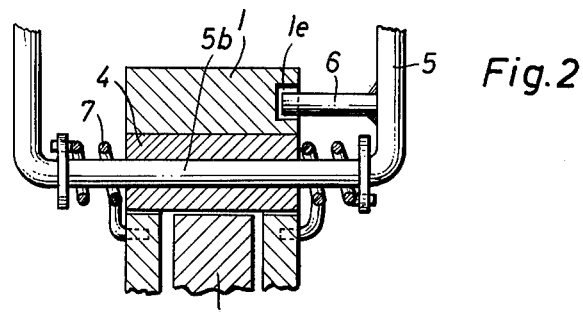
INVENTORS:
Kurt Karnath, Günther Karnath and Klaus
BY  Jürgen Karnath
Richards & Geier
ATTORNEYS

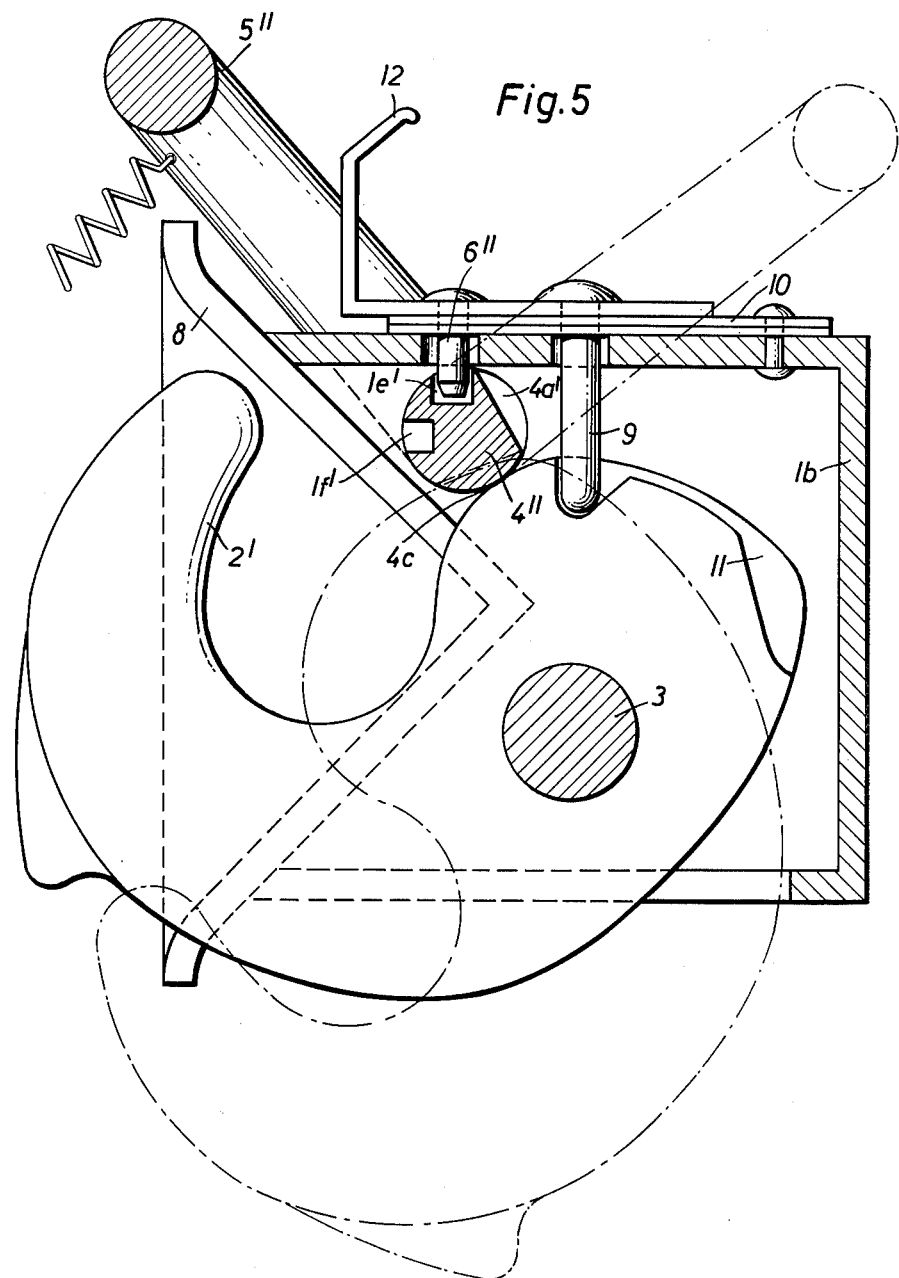

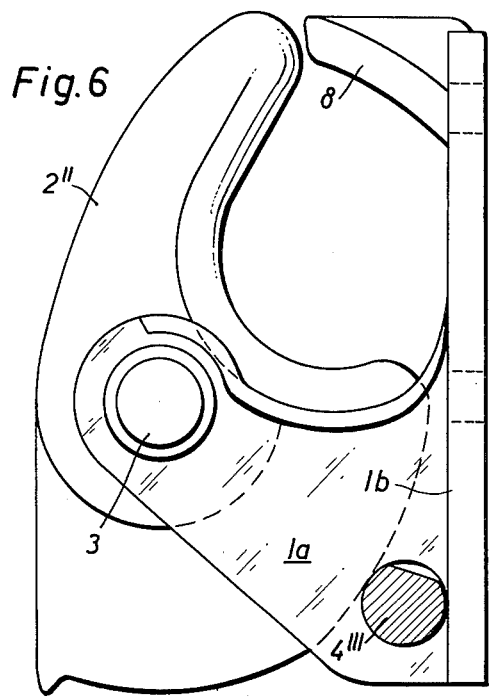
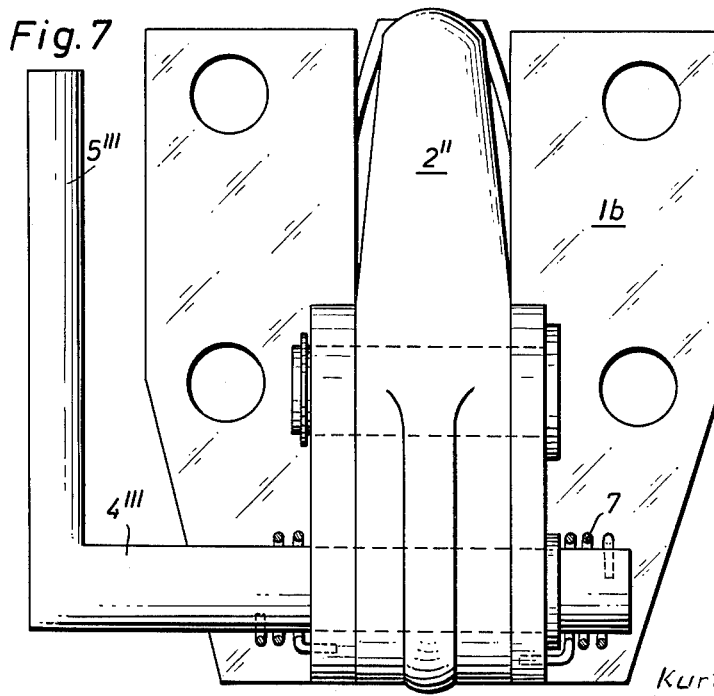

United States Patent Office 3,204,985
Patented Sept. 7, 1965

3,204,985
TRAILER COUPLING
Kurt Karnath, Wiesbaden, Günther Karnath, Unna, Westphalia, and Klaus Jürgen Karnath, Wiesbaden, Germany, assignors to M. H. Hoepli, New York, N.Y., and said Klaus Jürgen Karnath, Wiesbaden, Germany
Filed Mar. 7, 1963, Ser. No. 265,305
Claims priority, application Germany, Mar. 7, 1962, K 46,099
1 Claim. (Cl. 280—504)

This invention relates to a trailer coupling and refers more particularly to a trailer coupling provided with a rotary connecting hook, a double lock and a lead-in funnel.

Trailer couplings of this type have been constructed in many different ways. Couplings of land vehicles are subject to particularly great stresses. Breakage of trailer couplings can be very dangerous particularly in streets. Therefore, the main requirement for all such couplings is that they should not be able to open unintentionally. Other requirements are that they should be simple in construction and consist of a few sturdy parts, that they should be easly operated by a single operational lever, that they should be highly resistant against dirt and rust, that they should be of short length and height, that they should require no lubrication and that their operational parts should be controlled from the outside.

Prior art trailer couplings of the described type have a casing the interior of which contains practically all operationally important construction parts which can not be controlled from the outside, such as spring-engaged one-armed and two-armed bolting levers mounted upon their axles, draw springs and pressure springs, spring bolts and other parts; however, all these parts do not provide adequate security against bending, shearing and wear.

An object of the preesnt invention is to improve prior art constructions through the provision of a trailer coupling which complies with all the above stated requirements and which is so constructed that the interior of the coupling casing does not contain concealed constructional parts.

Other objects of the present invention will become apparent in the course of the following specification.

The trailer coupling of the present invention is so constructed that it provides in a novel manner security against an unintentional opening of the coupling. The invention uses in a novel manner as its most important structural feature a roller constructed to prevent unintentional openings. Other constructional elements of the coupling are built around the roller. There are no parts within the coupling casing which can detrimentally affect the operation of the coupling through breakage, bending, shearing, dirt or rust. Furthermore, there are no parts within the casing which require any lubrication. Prior art parts which engage the coupling hook within the casing, are replaced according to this invention by a single member, namely, the above-mentioned roller which lies against a wall of the casing and therefore can not be subjected to bending or shearing forces; thus the roller at all times remains insensitive and operational.

In accordance with a characteristic feature of the present invention, the roller which is connected with a single actuating lever, is located within the coupling casing parallel to the axis of the coupling hook and is mounted in the plane of rotation of the coupling hook between the hook and a wall of the casing, whereby the roller acts as a wedge securing the coupling hook in the locking position and preventing any unpremeditated opening.

The single operating lever is connected with the roller outside of the casing in such manner that the roller turns along with the lever while the latter carries out its opening and locking movements. The end positions of the operating lever and, therefore, of the roller, are secured outside of the casing by securing members which are known per se. Thus they can be always controlled by the operators.

Since in its closed position the roller is in line contact with a wall of the casing and the coupling hook, the contact area is so small that the operator can easily turn the roller irrespective of any load thereon.

The invention will appear more clearly from the following detailed description when taken in connection with the accompanying drawings showing, by way of example, preferred embodiments of the inventive idea.

In the drawings:

FIGURE 1 is a side view of a coupling of the present invention, some parts being shown in section.

FIGURE 2 is a section of the actuating mechanism along the line II—II of FIG. 1.

FIGURE 5 illustrates a different embodiment of the present invention partly in side elevation and partly in section.

FIGURE 6 shows in side view, partly in section, another embodiment which is particularly suitable for lighter vehicles, such as jeeps and the like.

FIGURE 7 is a top view of the construction shown in FIG. 6.

Similar parts are indicated by the same numerals throughout the drawings.

Figure 3:
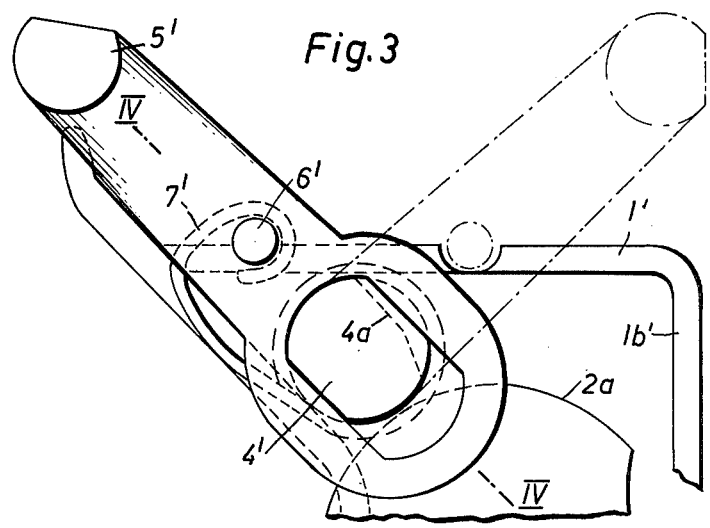
FIGURE 3 illustrates in side view a somewhat different arrangement of the operational lever of the coupling.

FIGURES 1 and 2 show a trailer coupling having a casing 1 provided with walls 1a, 1b and 1c. The casing 1 is provided with a lead-in funnel 8 and contains a coupling hook 2 mounted upon an axle 3, as well as a roller 4. The axle 3 and the roller 4 are mounted in the side walls 1a of the casing.

In opposed locking position the back 2a of the hook 2 is in line contact with the round outer surface of the roller 4 which in turn is in contact with the upper wall of the casing 1.

The sole operational lever 5 is firmly connected with the roller 4, so that the roller 4 turns along with the lever 5. FIGURE 1 shows in broken lines the open positions of the roller and of the operational lever 5. The coupling hook 2 can be freely turned in this open position.

The roller 4 has a portion 4a which is substantially flat but slightly angular, which is used in case the pulling vehicle and the trailer are joined but the coupling is to be kept open.

Additional safety for the roller 4 in its closed and open positions is provided by a locking pin 6 carried by the lever 5 and fitting into recesses 1e and 1f provided in the casing 1. This safety device extending between the lever 5 and the casing 1 may be a lock of the type known in the art, its important features being that it should not be subjected to the pulling and pressure forces which are exerted upon the coupling and that it should be controlled from the outside.

The construction and operation of the lever 5 are best shown in FIG. 2. The central portion 5b of the lever 5 extends through a central bore of the roller 4. The bore and the lever 5 are so profiled that the roller 4 will turn alone with the lever 5. However, the lever portion 5b can move axially relatively to the roller 4. Coiled springs 7 enclose portions of the lever 5 and have ends fixed to the casing 1, as well as other ends connected to pins carried by the lever 5. The springs 7 tend to pull the lever 5 from its open position to its closed position and to move the lever sidewise so as to pull the safety pin 6 into the recess 1e.

Operation

In order to open the coupling, before the lever 5 can be moved into the open position it must be pulled by hand sidewise (to the right—looking in the direction of FIG. 2) so as to pull the pin 6 out of the recess 1e. Then the lever 5 can be turned clockwise (looking in the direction of FIG. 1) compressing the springs 7. The roller 4 rotates along with the lever 5, so that its flat portion 4a will move directly above the hook 2. Then the hook 2 will not be blocked any more and will be able to swing downwardly by its own weight or by the pull of the trailer pole (not shown). In the open position of the hook 2, its back portion 2a' will engage the flat portion 4a of the roller and thus it will be impossible for the springs 7 to swing back the lever 5.

Special circumstances may arise when the trailer is so connected with the pulling vehicle that the eye of the trailer pole prevents the hook 2 from falling into the open position. In that case the operator must pull the lever 5 still further forward until the safety pin 6 is inserted into the recess 1f. When the pulling vehicle now moves forward, it will not take the trailer along with it but the trailer pole will pull the hook 2 into the open position.

In order to again connect the hook 2 with the eye of a trailer pole, the operator must pull the lever 5 sidewise so as to pull the pin 6 out of the recess 1f and then move the lever 5 back into the closed position shown in full lines in FIG. 1. The slightly angular flat portions 4a make it possible to provide for the lever 5 a normal open position and an extreme end open position.

In general, the trailer is attached to the pulling vehicle either by a rearward motion of the vehicle, or by pushing the trailer forwardly, until the eye of the trailer pole pushes the hook 2 and turns it about its axle 3 into the closing position. The back portion 2a thereby leaves the flat portion 4a of the roller 4. The springs 7 will tend to pull the lever 5 into its locked position and the pin 6 enters the recess 1e. Then the coupling is closed and also locked. Obviously, the roller 4 turned along with the lever 5 and its curved portion is now turned toward the hook 2.

Figure 4:
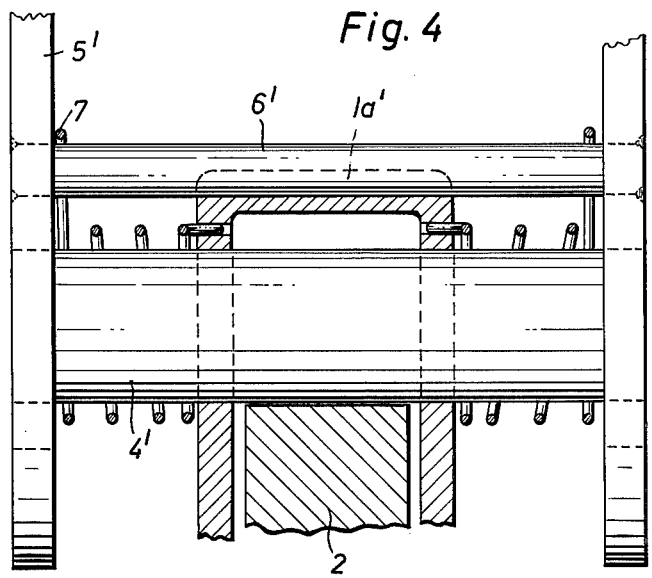
FIGURE 4 is a sectoin along the line IV—IV of FIG. 3.

FIGURES 3 and 4 illustrate a different connection of the operational lever 5' with the roller 4'. In this construction the sides of the lever 5' have openings provided with flat edges; the roller 4' has ends located outside of the casing 1 and extending into these openings with play which permits a short upward movement of the lever. However, these ends of the roller have flat sides engaging said flat edges. Furthermore, in this construction the safety member 6' consists of a rod extending between the sides of the lever 5'. Helical springs 7' are wound around the ends of the roller 4' and are fixed to the rod 6' and to the casing. The springs 7' tend to pull the lever 5' downwardly and rearwardly. The rod 6' fits into one of the elongated grooves 1a' provided upon an outer surface of the casing 1' having side walls 1b'.

Operation

To move the lever 5' from a locked position shown in full lines in FIG. 3, into an open position shown by broken lines, the operator must begin by moving the rod 6' by hand out of the groove 1a' in which it is located in the locked position. Then the operator can pull the lever 5' upwardly. In other respects the operation is the same as that previously described.

FIGURE 5 illustrates a construction wherein the closing of the coupling takes place automatically. This is accomplished by a packet of flat springs 10 located upon an upper wall of the casing, a safety pin 6" and a curved guide 11 constituting a part of the back portion of the hook 2'. In this construction, locking recesses 1e' and 1f' are provided upon an end portion of the roller 4". A grip 12 connected with the pin 6" is located between the sides of the lever 5". This construction also includes a helical return spring (not shown) which tends to move the lever 5" from its open position to its closed position.

The roller 4" has a slightly raised portion 4c the purpose of which is to compensate for the wear to which the roller is subjected.

Operation

To open the coupling, the operator must first pull the grip 12 by hand, so as to withdraw the pin 6" from the recess 1e' in the roller 4". Then the lever 5" may be swung forwardly. The roller 4" will rotate along with the lever 5" and its flattened portion 4a' will move over the back of the hook 2'. The hook 2' will drop into its open position and during this movement the curved guide 11 of the hook 2' will engage and push the pin 9 upwardly, thereby moving the springs 10 and maintaining the pin 6" out of engagement with the roller 4". A return spring will tend to pull the lever 5" back into its initial closed position, but this will be prevented by the engagement of the back portion of the hook 2' with the flat portion 4a' of the roller 4'''. The guide 11 will permit the pin 6" to drop into the recess 1f'. Then the coupling remains open. To lock the coupling, the hook 2' is moved, its curved guide 11 will actuate the pin 9 withdrawing the pin 6" from the recess 1f'. The return spring will move back the lever 5" and the pins 6" and 9 will finally assume the position shown in FIG. 5 wherein the coupling is firmly and securely locked.

FIGURES 6 and 7 illustrate a coupling which is particularly suitable for vehicles, such as jeeps, provided with a single axle trailer. In this construction the locking roller 4''' is located below and parallel to the axle 3 of the hook 2" and is supported against the wall 1b of the casing. Due to this arrangement the mouth of the coupling formed by the hook 2", the wall 1b and a part of the lead-in funnel 8, is located in direct proximity of the cross bar of the pulling vehicle. The roller 4''' and the lever 5''' are integrally connected with each other. Springs 7 similar to those already described exert pressing and turning forces. Spring-engaged bolts (not shown) which may be carried by the lever 5''' may be used to lock the lever 5''' in its open and closed positions.

Operation

The coupling is opened by moving the lever 5''' from the vertical position into a horizontal position against the action of the springs 7. The roller 4''' turns with the lever and its flattened side will be directed toward the hook 2", so that the hook will drop into the opened position by its own weight or by the pulling force of the trailer pole. The operator should guide the trailer pole with his free hand so as to prevent its shifting in any direction. If the operator lets go of the lever 5''', the lever can not move back into its vertical position by the force of the springs 7, since the back portion of the hook lies against the flat portion of the roller 4'''. Both hands of the operator will be free for the further guiding of the trailer pole.

To close the coupling, the operator will move the trailer pole by hand. The eye of the pole will press against the back portion of the hook and will turn the hook. The roller 4''' will be turned and will lock the hook, as shown in FIG. 6. Then a spring-engaged bolt (not shown) may be introduced into a recess provided in the casing so as to provide double security for the coupling in its closed position.

It is apparent that the examples described above have been given solely by way of illustration and not by way of limitation and that they are subject to many variations and modifications within the scope of the present invention. All such variations and modifications are to be included within the scope of the present invention.

What is claimed is:

A trailer coupling, comprising a casing, an axle carried by said casing, a hook mounted upon said axle and swingable between open and closed positions, a roller carried by said casing parallel to said axle and having a portion engaging said hook in the closed position of said hook to lock the hook, said roller having another flattened portion spaced from said hook to enable said hook to carry out its swinging movements, a lever having a portion extending through said roller, said lever being rotatable along with said roller and being movable axially relatively thereto, a pin carried by said lever and fitting into recesses formed in said casing, and a coiled spring connected with said lever and said casing for pulling said lever into said closed position and said pin into one of said recesses.

References Cited by the Examiner

UNITED STATES PATENTS

| | | | |
|---|---|---|---|
| 1,353,094 | 9/20 | Trumpour | 280—504 |
| 2,491,143 | 12/49 | Weiss | 280—504 |
| 2,842,380 | 7/58 | Weiss | 280—504 |
| 2,951,711 | 9/60 | Karnath et al. | 280—508 |

A. HARRY LEVY, *Primary Examiner.*